No. 876,574.
PATENTED JAN. 14, 1908.
E. J. McCLELLAN.
INDEXING OR DIVIDING HEAD.
APPLICATION FILED MAR. 29, 1907.
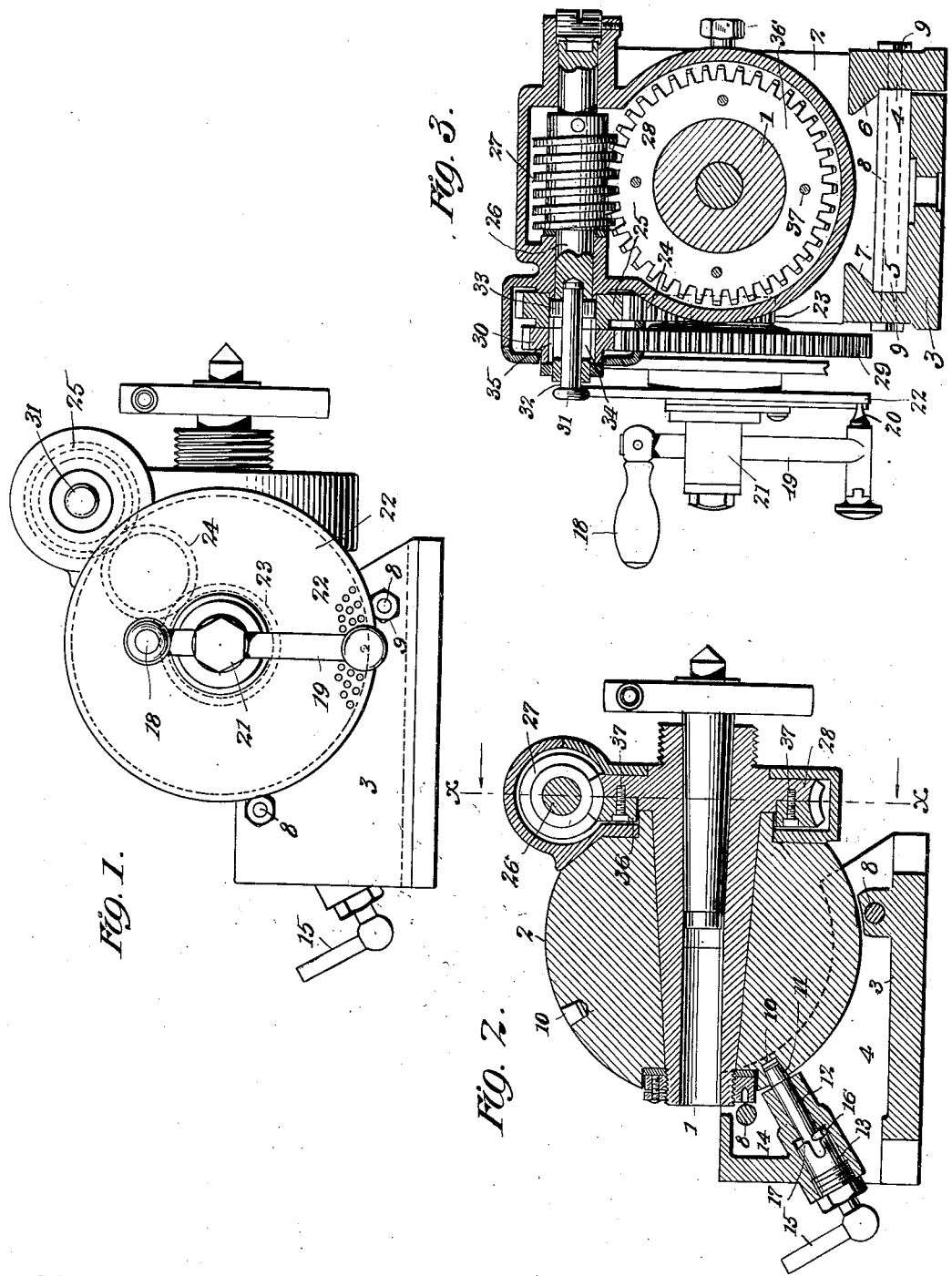
Witnesses:
Inventor
Edward J. McClellan
By his Attorneys
Rosenbaum & Stockbridge

UNITED STATES PATENT OFFICE.

EDWARD J. McCLELLAN, OF NEW YORK, N. Y., ASSIGNOR TO THE GARVIN MACHINE COMPANY, A CORPORATION OF NEW YORK.

INDEXING OR DIVIDING HEAD.

No. 876,574.  Specification of Letters Patent.  Patented Jan. 14, 1908.

Application filed March 29, 1907. Serial No. 365,284.

*To all whom it may concern:*

Be it known that I, EDWARD J. McCLELLAN, a citizen of the United States, residing at New York, in the county of New York and State of New York, have invented certain new and useful Improvements in Indexing or Dividing Heads, of which the following is a full, clear, and exact description.

This invention relates to dividing or index heads for milling and other machines, the work being fixed upon a spindle, and the operation controlled by setting said spindle at different angular positions of rotation and direction, whereby spur or bevel gears may be cut, or work milled at various angles and in various positions.

The work is chucked or centered upon the spindle which is mounted in the head, and by means of a train of gearing actuated by an index shaft or handle, the work is accurately adjusted to the positions desired; suitable dial or dials being provided to coöperate with the index shaft. The train of gearing commonly used includes a worm wheel mounted upon the work-carrying spindle, and a worm meshing with said wheel and turned by means of said index shaft. Usually the worm wheel has forty teeth, and the index shaft is connected to rotate at the same angular speed with the worm, so that forty revolutions of the shaft are required to effect a single revolution of the spindle, whereby very fine adjustments of the spindle and work may be easily obtained.

In practice, the cutting of squares and hexagons upon dividing heads is quite common. The liability to error in counting the number of turns of the indexing shaft to secure these common divisions, prompted manufacturers to apply an auxiliary or supplementary dial mounted directly on the spindle (generally termed as a "quick index dial"): These auxiliary dials being arranged with holes or notches and a locking device, eliminated the chances of error, for the most commonly required indexing, say squares, hexagons or octagons. In operating this style of dividing-head, however, it was necessary to disengage the worm from the worm wheel, and the worm was rarely likely to reënter the same teeth of the worm wheel from which it was disengaged, and hence made uncertain the precision of the work required from this class of mechanism.

This invention materially facilitates quick indexing, the elimination of the dangers of errors, as well as retaining the feature of always keeping the worm and worm wheel in connection, a paramount requirement for reliable accuracy. To this end two sets of connections are provided between the index shaft and the worm. The first set causes the worm to turn at the same angular speed as the index handle, whereby fine adjustments of the work are secured and gear cutting or fine dividing is facilitated; and the second set enables a single revolution of the handle to effect a gross adjustment of the spindle preferably giving the spindle an exact twelfth of a revolution. Thus three even turns of the handle are required to move the work through a quarter of a revolution, and two even turns through a sixth, so that the possibility of error in the count is greatly reduced. Means are provided for rendering either set of connections operative between the handle and the worm while the other set is disconnected or rendered inoperative.

In the preferred form of the invention, two pinions are mounted loosely upon the worm-shaft, a small gear is fixed upon the index arm shaft and connected by an intermediate gear to one of said pinions, so that the handle rotates at the same angular speed as the worm; while a large gear also fixed upon the index shaft meshes directly with the other of said pinions, and a clutch is provided to connect either pinion positively to the worm shaft, as may be required. Said large gear has preferably a ratio of three and one third to one with its pinion, so that by means of a single complete revolution of the arm, the worm wheel is turned through a twelfth of a revolution assuming that said worm wheel has forty teeth.

The work-carrying spindle is mounted upon a stock which is swiveled upon a bed, so that the spindle may be caused either to lie horizontally or stand vertically, or to occupy any intermediate position, the stock being usually set to the required position and then clamped. The position of the swiveled stock is usually determined by means of a scale and index.

Another feature of the present invention resides in the provision of a lock-pin, which is mounted upon the bed and coöperates with sockets upon the stock, both to position the stock accurately, and also to clamp the same with the spindle either vertical or horizontal, and when in these very commonly used positions, the liability to spoil the work under operation, when subjected to the stress of a very heavy cut, is entirely removed. The lock-pin may be withdrawn to permit the turning of the stock, and may then be thrust into either socket and then by means of a handle, the lock-pin may be turned to cause its tapered end to fit snugly in the socket.

According to the present improvements, the worm-wheel is formed of two complementary tooth parts, one of said parts being integral with the spindle, and the other of said parts in the form of an annulus, revoluble upon the disk to take up back lash and wear between the wheel and the worm, and means being provided to fix the annulus to the disk. Heretofore it has been customary to key the worm-wheel removably to the spindle, but by forming one part of the worm wheel integral with the disk and providing revoluble adjustment of the other part relatively thereto, all liability of looseness between the wheel and the spindle is eliminated which is not true with keys even if two or three are provided as is usually the case in this class of apparatus.

In the accompanying drawings: Figure 1 is a side elevation of a dividing head embodying the present improvements. Fig. 2 is a central sectional elevation. Fig. 3 is a sectional front elevation, taken at the line X—X of Fig. 2.

A work-carrying tapered spindle 1 is revolubly mounted in a stock 2, which is swiveled upon a base 3 suitable for attachment to the bed of a milling machine. The base is provided with sides 4, 5 having interior bevel flanges 6, 7, to engage dove-tailed grooves formed upon the sides of the stock 2 to permit the stock to be adjusted from horizontal to vertical positions. The sides 4, 5, are connected by clamping rods 8 having nuts 9 to draw the sides 4, 5, towards each other, to bind the swiveled stock in different positions to which it may be adjusted between horizontal and vertical.

Spaced at an interval of ninety degrees about in the periphery of the stock 2 are tapered sockets 10, to receive the tapered point 11 of a lock-pin 12, which is mounted in a housing 13 in the form of a screw, threaded into a boss 14 cast on the bed between the side walls and sufficiently close to one of the walls to escape the spindle 1, when the stock is rotated. A handle 15 is used to turn the bolt to cause a projection 16 thereon to ride up on a cam 17 formed on the edge of the screw 13, to force said lock-pin into the socket 10. The lock-pin has a close fit in the inner end of the boss 14, and when it is forced into the socket, as described, it is enabled to position the stock 2 with great accuracy. The spindle 1 is rotated by means of a handle 18 carried upon an arm 19 having an index 20 and fixed upon a horizontal revoluble shaft 21, a suitable index dial 22 being mounted concentrically with said shaft.

Upon the inner end of the shaft is secured a gear 23 connected by an intermediate gear 24 with a pinion 25 mounted loosely on a shaft 26 to which is secured a worm 27 meshing with a worm wheel 28 upon the spindle 1. Upon the shaft 21 is also fixed a gear 29 larger than the gear 23 and meshing directly with a pinion 30 also loose on the worm shaft 26. By pulling out a button 31 carried on a pin 32 mounted in one end of the worm shaft 26 and carrying a clutch 33, the pinion 25 may be disconnected from the shaft 26 and the pinion 30 connected thereto; said clutch in the form of a key confined in a longitudinal slot 34 in the shaft 26 and projecting from said slot to engage suitable notches 35 formed interiorly on the pinions.

The worm wheel 28 preferably has forty teeth, and the index arm 19 is connected to turn in the same direction and at the same angular speed as the worm 27, thus affording an adjustment of the spindle 1 adapted to a standard index head. When it is desired to effect gross adjustment of the spindle for squares and hexagon shapes, the clutch button 31 is pulled out to release the pinion 25 and connect the pinion 30 to the worm 27. The ratio of the gear 29 to the pinion 30 is preferably 3-⅓ to 1 so that a single revolution of the arm 19 effects one-twelfth of a revolution of the spindle 1. This connection is used when it is desired to operate on work requiring 60°, 90°, 120° or similar angles; when it is desired to effect fractional or special ratio adjustments of the spindle, it is merely necessary to press in the clutch button 31 to disconnect the pinion 30 and reconnect the pinion 25 to the worm shaft.

The axis of the shaft 21 is coincident with the axis about which the swivel stock 2 turns, for convenience when the device is used in connection with power-driven gears in mesh with the described gears, to effect uninterrupted rotation of the spindle when cutting spiral etc., as the stock 2 can then be turned without disconnecting the gear 23 from the power-driven gear with which it is in mesh.

The worm 28 consists of two parts, one of which is integral with the spindle 1, as seen at Fig. 2, and the other of which 36 is in the form of an annulus, adjustably secured by screws 37 to the main part 28 of the worm. Each of said parts is toothed and by turning the annulus 36 slightly, the play between the worm wheel and the worm 27 can be taken up, thus compensating for any inaccuracy due to wear. This is a usual construction except that one of the parts is integral with the spindle. It is evident that there can be no possible looseness between the worm and the spindle under any circumstances, since part of the worm is integral therewith, as if looseness develops, it is sure to be in the worm teeth and can be at once wholly overcome by the adjustment.

What I claim is:

1. In a dividing head, a work spindle having a gear, a worm meshing with said gear, an index shaft, a plurality of gear trains of different pitch ratio between said index shaft and said worm, and means for rendering any desired gear train operative.

2. In a dividing head, a work spindle having a gear, a worm meshing with said gear, an index shaft, a train of gearing of unit ratio between said shaft and said worm, a second train of gearing adapted to rotate said spindle through quarters or sixths of a revolution by unit turns of said shaft, and means for rendering either of said gear trains operative.

3. In a dividing or indexing mechanism, a bed, a base adjustable thereon and having interior curved or arcuate flanges, a stock having dove-tailed grooves to engage said flanges and having a concentrically curved peripheral portion between the flanges, said curved portion having a plurality of taper sockets, a bolt in said bed adapted to enter said sockets, and positive means for impelling the bolt into locking relation in the sockets.

In witness whereof, I subscribe my signature, in the presence of two witnesses.

EDWARD J. McCLELLAN.

Witnesses:
J. T. WILLIAMS,
CHAS. T. LUTHER.